(12) United States Patent
Neri et al.

(10) Patent No.: US 10,465,589 B2
(45) Date of Patent: Nov. 5, 2019

(54) SELECTIVE CATALYTIC REDUCTION FAULT DETECTION

(71) Applicant: GM Global Technology Operations LLC, Detroit, MI (US)

(72) Inventors: Alessandra Neri, Turin (IT); Alessia Tuninetti, Turin (IT); Maria Camuglia, Francavilla di Sicilia (IT); Giulio Binetti, Puglia (IT); Giuseppe Mazzara Bologna, Nicosia (IT); Alberto Bemporad, Lucca (IT); Daniele Bernardini, Milan (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 52 days.

(21) Appl. No.: 15/925,116

(22) Filed: Mar. 19, 2018

(65) Prior Publication Data

US 2019/0284981 A1    Sep. 19, 2019

(51) Int. Cl.
*F01N 11/00* (2006.01)
*F01N 3/20* (2006.01)

(52) U.S. Cl.
CPC ............ *F01N 11/002* (2013.01); *F01N 3/208* (2013.01); *F01N 2550/02* (2013.01); *F01N 2550/03* (2013.01); *F01N 2560/06* (2013.01); *F01N 2610/02* (2013.01); *F01N 2900/0601* (2013.01); *F01N 2900/1602* (2013.01); *F01N 2900/1622* (2013.01)

(58) Field of Classification Search
CPC combination set(s) only.
See application file for complete search history.

(56) References Cited

U.S. PATENT DOCUMENTS

| | | | |
|---|---|---|---|
| 9,732,684 B2 * | 8/2017 | Yasui | F01N 3/208 |
| 9,803,532 B2 * | 10/2017 | Li | F01N 3/208 |
| 10,018,092 B2 * | 7/2018 | Wang | B01D 53/9431 |
| 10,202,879 B2 * | 2/2019 | Mao | F01N 3/2066 |
| 10,329,988 B2 * | 6/2019 | Okamoto | F01N 11/007 |

* cited by examiner

*Primary Examiner* — Binh Q Tran
(74) *Attorney, Agent, or Firm* — Cantor Colburn LLP

(57) ABSTRACT

Technical solutions are described for selective catalytic reduction diagnosis in an emissions control system or an exhaust system used for treating exhaust gas, such as in a motor vehicle including an internal combustion engine. An example emissions control system includes a selective catalytic reduction (SCR) device. The emissions control system further includes a controller that is performs SCR fault diagnosis. The SCR fault diagnosis includes computing a plurality of estimated NH3 storage capacity values ($\Theta$) of an SCR catalyst of the SCR device. The diagnosis further includes determining a diagnostic parameter of the SCR device using the plurality of estimated NH3 storage capacity values.

20 Claims, 5 Drawing Sheets

SELECTIVE CATALYTIC REDUCTION FAULT DETECTION

INTRODUCTION

The present disclosure relates to exhaust systems for internal combustion engines, and more particularly to exhaust systems using selective catalytic reduction (SCR) units for emission control.

Exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("NO$_x$") as well as condensed phase materials (liquids and solids) that constitute particulate matter ("PM"). Catalyst compositions, typically disposed on catalyst supports or substrates, are provided in an engine exhaust system as part of an aftertreatment system to convert certain, or all of these exhaust constituents into non-regulated exhaust gas components.

Exhaust gas treatment systems typically include selective catalytic reduction (SCR) devices. An SCR device includes a substrate having an SCR catalyst disposed thereon to reduce the amount of NOx in the exhaust gas. The typical exhaust treatment system also includes a reductant delivery system that injects a reductant such as, for example, ammonia (NH3), urea (CO(NH2)2, etc.). The SCR device makes use of NH3 to reduce the NOx. For example, when the proper amount of NH3 is supplied to the SCR device under the proper conditions, the NH3 reacts with the NOx in the presence of the SCR catalyst to reduce the NOx emissions. If the reduction reaction rate is too slow, or if there is excess ammonia in the exhaust, ammonia can pass through ("slip") from the SCR. On the other hand, if there is too little ammonia in the exhaust, SCR NOx conversion efficiency will be decreased.

SUMMARY

According to one or more embodiments, an emissions control system for treating exhaust gas in a motor vehicle including an internal combustion engine is described. The emissions control system includes a selective catalytic reduction (SCR) device. The emissions control system further includes a controller that is performs SCR fault diagnosis. The SCR fault diagnosis includes computing a plurality of estimated NH3 storage capacity values (Θ) of an SCR catalyst of the SCR device. The diagnosis further includes determining a diagnostic parameter of the SCR device using the plurality of estimated NH3 storage capacity values. Determining the diagnostic parameter is based on computing:

$$f_i = \begin{cases} (\Theta_i/\Theta_{nom} - 1)^2 & \text{if } \Theta_i < \Theta_{nom} \\ -(\Theta_i/\Theta_{nom} - 1)^2 & \text{otherwise} \end{cases}; \text{ and}$$

on computing $$f_{avg} = \frac{1}{N}\sum_{i=1}^{N} f_i,$$

where $\Theta_{nom}$ is a predetermined calibration value, $f_{avg}$ is the diagnostic parameter, and N is a number of values in the plurality of estimated NH3 storage capacity values.

The controller determines that an SCR fault exists in response to the diagnostic parameter exceeding a predetermined threshold. Further, determining the diagnostic parameter further includes checking that at least a predetermined percentage (V) of the plurality of estimated NH3 storage capacity values (Θ) is valid. Also, the diagnostic parameter is computed in response to at least the predetermined percentage (V) of the plurality of estimated NH3 storage capacity values (Θ) being valid. If at least the predetermined percentage (V) of the plurality of estimated NH3 storage capacity values (Θ) are not valid, the diagnosis includes removing an oldest set of predetermined number of estimated NH3 storage capacity values from the plurality of estimated NH3 storage capacity values, and repeating the SCR fault diagnosis using additional estimated NH3 storage capacity values to the plurality of estimated NH3 storage capacity values.

A validity of an estimated NH3 storage capacity value is determined based on a condition-flag. The condition-flag is indicative of a confidence of estimation accuracy of the estimated NH3 storage capacity value. Further, the SCR fault diagnosis is performed in response to a SCR catalyst temperature being within a predetermined range at a time the estimated NH3 storage capacity value was computed.

According to one or more embodiments an exhaust system for treating exhaust gas emitted by an internal combustion engine by performing a selective catalytic reduction (SCR) of exhaust gas is described. The system includes a controller that performs SCR fault diagnosis. The SCR fault diagnosis includes computing a plurality of estimated NH3 storage capacity values (Θ) of an SCR catalyst of the SCR device. The diagnosis further includes determining a diagnostic parameter of the SCR device using the plurality of estimated NH3 storage capacity values. Determining the diagnostic parameter is based on computing:

$$f_i = \begin{cases} (\Theta_i/\Theta_{nom} - 1)^2 & \text{if } \Theta_i < \Theta_{nom} \\ -(\Theta_i/\Theta_{nom} - 1)^2 & \text{otherwise} \end{cases}; \text{ and}$$

on computing $$f_{avg} = \frac{1}{N}\sum_{i=1}^{N} f_i,$$

where $\Theta_{nom}$ is a predetermined calibration value, $f_{avg}$ is the diagnostic parameter, and N is a number of values in the plurality of estimated NH3 storage capacity values.

The controller determines that an SCR fault exists in response to the diagnostic parameter exceeding a predetermined threshold. Further, determining the diagnostic parameter further includes checking that at least a predetermined percentage (V) of the plurality of estimated NH3 storage capacity values (Θ) is valid. Also, the diagnostic parameter is computed in response to at least the predetermined percentage (V) of the plurality of estimated NH3 storage capacity values (Θ) being valid. If at least the predetermined percentage (V) of the plurality of estimated NH3 storage capacity values (Θ) are not valid, the diagnosis includes removing an oldest set of predetermined number of estimated NH3 storage capacity values from the plurality of estimated NH3 storage capacity values, and repeating the SCR fault diagnosis using additional estimated NH3 storage capacity values to the plurality of estimated NH3 storage capacity values.

A validity of an estimated NH3 storage capacity value is determined based on a condition-flag. The condition-flag is indicative of a confidence of estimation accuracy of the estimated NH3 storage capacity value. Further, the SCR fault diagnosis is performed in response to a SCR catalyst temperature being within a predetermined range at a time the estimated NH3 storage capacity value was computed.

According to one or more embodiments a computer-implemented method for diagnosing a selective catalytic reduction (SCR) device of an exhaust system of an internal combustion engine. The method for the SCR diagnosis includes computing a plurality of estimated NH3 storage capacity values ($\Theta$) of an SCR catalyst of the SCR device. The method further includes determining a diagnostic parameter of the SCR device using the plurality of estimated NH3 storage capacity values. Determining the diagnostic parameter is based on computing:

$$f_i = \begin{cases} (\Theta_i/\Theta_{nom} - 1)^2 & \text{if } \Theta_i < \Theta_{nom} \\ -(\Theta_i/\Theta_{nom} - 1)^2 & \text{otherwise} \end{cases}; \text{ and}$$

on computing $$f_{avg} = \frac{1}{N}\sum_{i=1}^{N} f_i,$$

where $\Theta_{nom}$ is a predetermined calibration value, $f_{avg}$ is the diagnostic parameter, and N is a number of values in the plurality of estimated NH3 storage capacity values.

The controller determines that an SCR fault exists in response to the diagnostic parameter exceeding a predetermined threshold. Further, determining the diagnostic parameter further includes checking that at least a predetermined percentage (V) of the plurality of estimated NH3 storage capacity values ($\Theta$) is valid. Also, the diagnostic parameter is computed in response to at least the predetermined percentage (V) of the plurality of estimated NH3 storage capacity values ($\Theta$) being valid. If at least the predetermined percentage (V) of the plurality of estimated NH3 storage capacity values ($\Theta$) are not valid, the diagnosis includes removing an oldest set of predetermined number of estimated NH3 storage capacity values from the plurality of estimated NH3 storage capacity values, and repeating the SCR fault diagnosis using additional estimated NH3 storage capacity values to the plurality of estimated NH3 storage capacity values.

A validity of an estimated NH3 storage capacity value is determined based on a condition-flag. The condition-flag is indicative of a confidence of estimation accuracy of the estimated NH3 storage capacity value. Further, the SCR fault diagnosis is performed in response to a SCR catalyst temperature being within a predetermined range at a time the estimated NH3 storage capacity value was computed.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
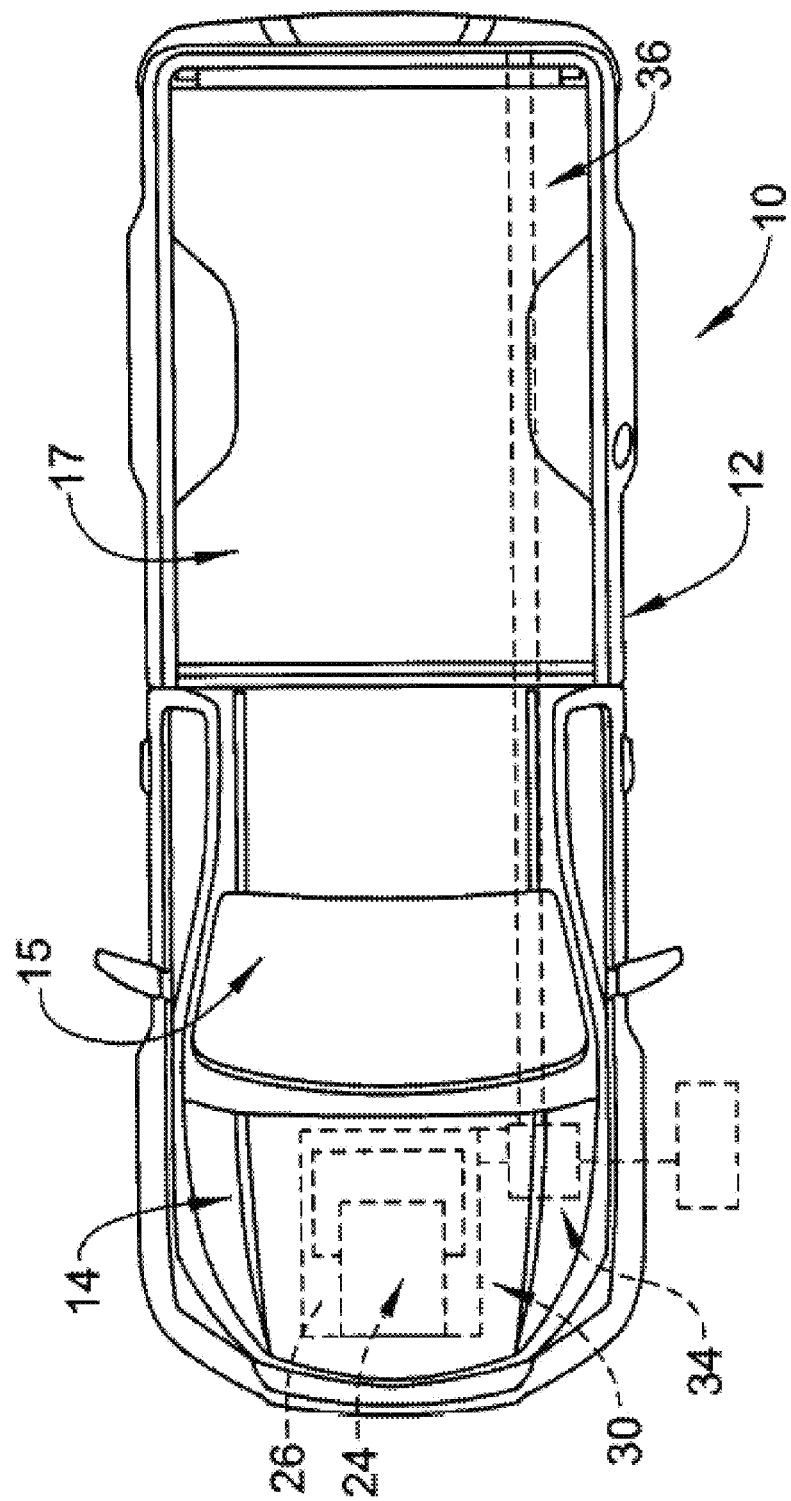
FIG. 1 depicts a motor vehicle including an internal combustion engine and an emission control system according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory module that executes one or more software or firmware programs, a combinational logic circuit, and/or other suitable components that provide the described functionality.

A motor vehicle, in accordance with an aspect of an exemplary embodiment, is indicated generally at 10 in FIG. 1. Motor vehicle 10 is shown in the form of a pickup truck. It is to be understood that motor vehicle 10 may take on various forms including automobiles, commercial transports, marine vehicles, and the like. Motor vehicle 10 includes a body 12 having an engine compartment 14, a passenger compartment 15, and a cargo bed 17. Engine compartment 14 houses an internal combustion engine system 24, which, in the exemplary embodiment shown, may include a diesel engine 24. Internal combustion engine system 24 includes an exhaust system 30 that is fluidically connected to an aftertreatment or emissions control system 34. Exhaust produced by internal combustion engine (ICE) system 24 passes through emissions control system 34 to reduce emissions that may exit to ambient through an exhaust outlet pipe 36.

It should be noted that technical solutions described herein are germane to ICE systems that can include, but are not limited to, diesel engine systems and gasoline engine systems. The ICE system 24 can include a plurality of reciprocating pistons attached to a crankshaft, which may be operably attached to a driveline, such as a vehicle driveline, to power a vehicle (e.g., deliver tractive torque to the driveline). For example, the ICE system 24 can be any engine configuration or application, including various vehicular applications (e.g., automotive, marine and the like), as well as various non-vehicular applications (e.g., pumps, generators and the like). While the ICEs may be described in a vehicular context (e.g., generating torque), other non-vehicular applications are within the scope of this disclosure. Therefore, when reference is made to a vehicle, such disclosure should be interpreted as applicable to any application of an ICE system.

Moreover, an ICE can generally represent any device capable of generating an exhaust stream comprising gaseous (e.g., $NO_x$, $O_2$), carbonaceous, and/or particulate matter species, and the disclosure herein should accordingly be interpreted as applicable to all such devices. As used herein, "exhaust gas" refers to any chemical species or mixture of chemical species which may require treatment, and includes gaseous, liquid, and solid species. For example, an exhaust gas stream may contain a mixture of one or more $NO_x$ species, one or more liquid hydrocarbon species, and one more solid particulate species (e.g., ash). It should be further understood that the embodiments disclosed herein may be applicable to treatment of effluent streams not comprising carbonaceous and/or particulate matter species, and, in such instances, ICE 24 can also generally represent any device capable of generating an effluent stream comprising such species. Exhaust gas particulate matter generally includes carbonaceous soot, and other solid and/or liquid carbon-containing, species which are germane to ICE exhaust gas or form within an emissions control system 34.

Figure 2:
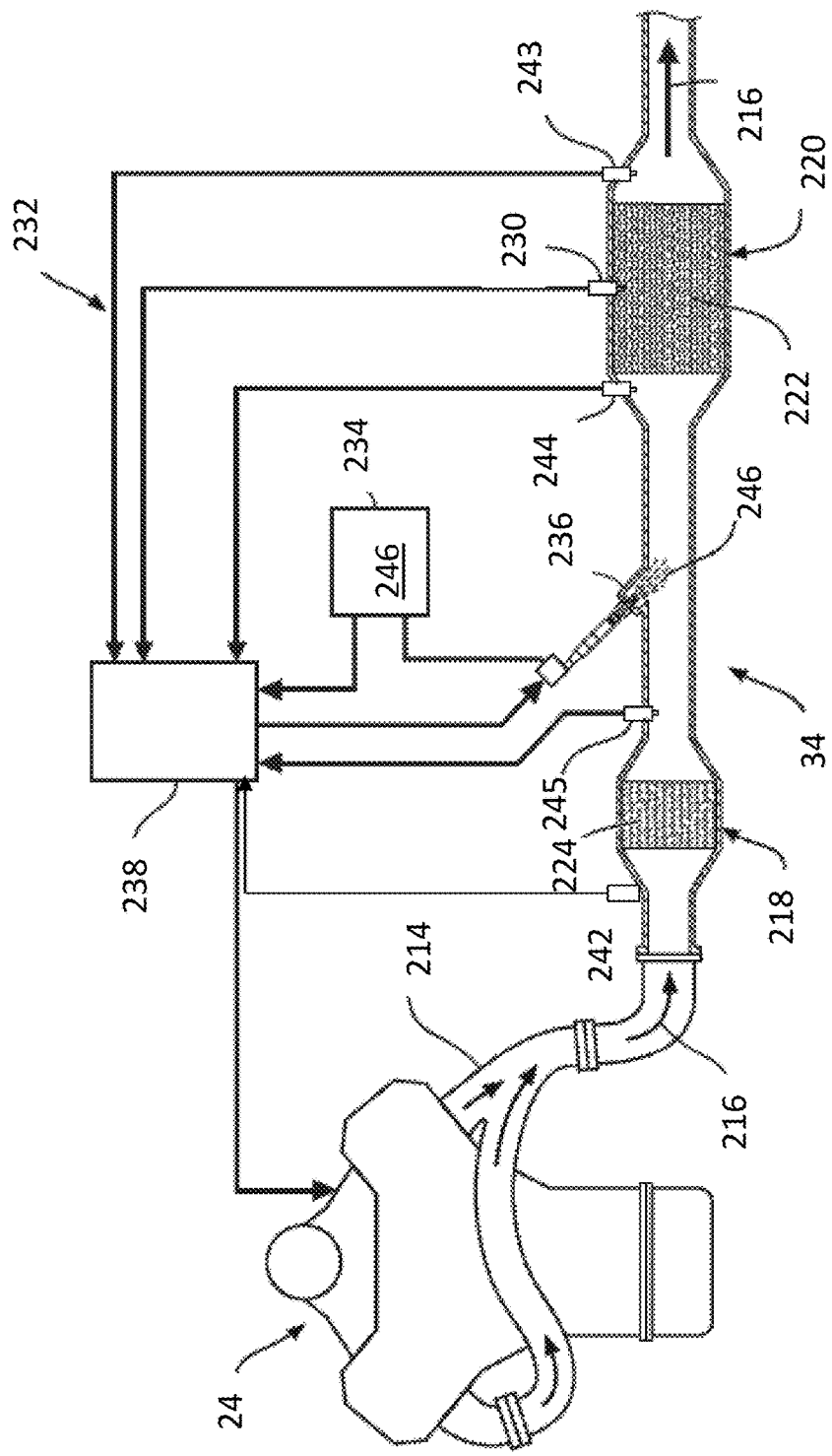
FIG. 2 illustrates example components of an emissions control system according to one or more embodiments.

FIG. 2 illustrates example components of the emissions control system 34 according to one or more embodiments. It should be noted that while the internal combustions engine system 24 includes a diesel engine 24 in the above example, the emissions control system 34 described herein can be implemented in various engine systems. The emissions control system 34 facilitates the control and monitoring of $NO_x$ storage and/or treatment materials, to control exhaust constituents emitted by the exhaust system 30. For example, the technical solutions herein provide methods for controlling selective catalytic reduction (SCR) devices, and appurtenant $NO_x$ sensors, wherein the SCR devices are configured to receive exhaust gas streams from an exhaust gas source, such as the ICE 24. As used herein, "$NO_x$" refers to one or more nitrogen oxides. $NO_x$ species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$. SCR devices are configured to receive reductant, such as at variable dosing rates as will be described below.

The exhaust gas conduit 214, which may comprise several segments, transports exhaust gas 216 from the engine 24 to the various exhaust treatment devices of the emissions control system 34. For example, as illustrated, the emission control system 34 includes a SCR device 220. In one or more examples, the SCR device 220 can include a selective catalytic reduction filter (SCRF) device, which provides the catalytic aspects of an SCR in addition to particulate filtering capabilities. Alternatively, or in addition, the SCR catalyst can also be coated on a flow through substrate. As can be appreciated, system 34 can include various additional treatment devices, including an oxidation catalyst (OC) device 218, and particulate filter devices (not shown), among others.

As can be appreciated, the OC device 218 can be one of various flow-through, oxidation catalyst devices known in the art. In various embodiments the OC device 218 may include a flow-through metal or ceramic monolith substrate 224. The substrate 224 may be packaged in a stainless steel shell or canister having an inlet and an outlet in fluid communication with the exhaust gas conduit 214. The substrate 224 may include an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof.

The OC device 218 is useful in treating unburned gaseous and non-volatile HC and CO, which are oxidized to form carbon dioxide and water. A washcoat layer includes a compositionally distinct layer of material disposed on the surface of the monolithic substrate or an underlying washcoat layer. A catalyst can contain one or more washcoat layers, and each washcoat layer can have unique chemical catalytic functions.

In the SCR device 220, the catalyst compositions for the SCR function and $NH_3$ oxidation function can reside in discrete washcoat layers on the substrate or, alternatively, the compositions for the SCR and $NH_3$ oxidation functions can reside in discrete longitudinal zones on the substrate. The SCR device 220 may be disposed downstream from the OC device 218. In one or more examples, the SCR device 220 includes a filter portion 222 that can be a wall flow filter that is configured to filter or trap carbon and other particulate matter in the exhaust gas 216. In at least one exemplary embodiment, the filter portion 222 is formed as a particulate filter (PF), such as a diesel particulate filter (DPF). The filter portion (i.e., the PF) may be constructed, for example, using a ceramic wall flow monolith exhaust gas filter substrate, which is packaged in a rigid, heat resistant shell or canister. The filter portion 222 has an inlet and an outlet in fluid communication with exhaust gas conduit 214 and may trap particulate matter as the exhaust gas 216 flows therethrough. It is appreciated that a ceramic wall flow monolith filter substrate is merely exemplary in nature and that the filter portion 222 may include other filter devices such as wound or packed fiber filters, open cell foams, sintered metal fibers, etc. The emissions control system 34 may also perform a regeneration process that regenerates the filter portion 222 by burning off the particulate matter trapped in the filter substrate, in one or more examples.

In one or more examples, the SCR device 220 receives reductant 246 at variable dosing rates. Reductant 246 can be supplied from a reductant supply source 234. In one or more examples, the reductant 246 is injected into the exhaust gas conduit 214 at a location upstream of the SCR device 220 using an injector 236, or other suitable method of delivery. The reductant 246 can be in the form of a gas, a liquid, or an aqueous solution, such as an aqueous urea solution. In one or more examples, the reductant 246 can be mixed with air in the injector 236 to aid in the dispersion of the injected spray. The catalyst containing washcoat disposed on the filter portion 222 or a flow through catalyst or a wall flow filter may reduce NOx constituents in the exhaust gas 216. The SCR device 220 utilizes the reductant 246, such as ammonia ($NH_3$), to reduce the NOx. The catalyst containing washcoat may contain a zeolite and one or more base metal components such as iron (Fe), cobalt (Co), copper (Cu), or vanadium (V), which can operate efficiently to convert NOx constituents of the exhaust gas 216 in the presence of $NH_3$.

The emissions control system 34 further includes a reductant delivery system 232 that introduces the reductant 246 to the exhaust gas 216. The reductant delivery system 232 includes the reductant supply 234 and the injector 236. The reductant supply 234 stores the reductant 246 and is in fluid communication with the injector 236. The reductant 246 may include, but is not limited to, $NH_3$. Accordingly, the injector 236 may inject a selectable amount of reductant 246 into the exhaust gas conduit 214 such that the reductant 246 is introduced to the exhaust gas 216.

In one or more examples, the emissions control system 34 further includes a control module 238 operably connected, via a number of sensors, to monitor the engine 24 and/or the exhaust gas treatment system 34. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. For example, module 238 can execute a SCR chemical model, as described below. As shown, the sensors can include an upstream $NO_x$ sensor 242 and downstream $NO_x$ sensor 243, disposed downstream of SCR device 220, each of which are in fluid communication with exhaust gas conduit 214. In one or more examples, the upstream NOx sensor 242 is disposed downstream of the ICE 24 and upstream of both SCR device 220 and the injector 236. The upstream $NO_x$ sensor 242 and the downstream $NO_x$ sensor 243 detect a $NO_x$ level proximate their location within exhaust gas conduit 214, and generate a NOx signal, which corresponds to the NOx level. A NOx level can comprise a concentration, a mass flow rate, or a volumetric flow rate, in some embodiments. A NOx signal generated by a NOx sensor can be interpreted by control module 238, for example. Control module 238 can optionally be in communication one or more temperature sensors, such as upstream temperature sensor 244, disposed upstream of the SCR device 220. In one or more examples, a NOx sensor 245 is added between the OC 218 and the SCR device 220.

The sensors of the emissions control system 34 may further include at least one pressure sensor 230 (e.g., a delta pressure sensor). The delta pressure sensor 230 may determine the pressure differential (i.e., Δp) across the SCR device 220. Although a single delta pressure sensor 230 is illustrated, it is appreciated that a plurality of pressure sensors may be used to determine the pressure differential of the SCR device 220. For example, a first pressure sensor may be disposed at the inlet of the SCR device 220 and a second pressure sensor may be disposed at the outlet of the SCR device 220. Accordingly, the difference between the pressure detected by the second delta pressure sensor and the pressure detected by the first delta pressure sensor may indicate the pressure differential across the SCR device 220. It should be noted that in other examples, the sensors can include different, additional, or fewer sensors than those illustrated/described herein.

In one or more examples, the SCR device 220 includes one or more components that utilize the reductant 246 and a catalyst to transform NO and $NO_2$ from the exhaust gases 216. The SCR device 220 can include, for example, a flow-through ceramic or metal monolith substrate that can be packaged in a shell or canister having an inlet and an outlet in fluid communication with the exhaust gas conduit 214 and optionally other exhaust treatment devices.

The substrate body can, for example, be a ceramic brick, a plate structure, or any other suitable structure such as a monolithic honeycomb structure that includes several hundred to several thousand parallel flow-through cells per square inch, although other configurations are suitable. Each of the flow-through cells can be defined by a wall surface on which the SCR catalyst composition can be washcoated. The substrate body can be formed from a material capable of withstanding the temperatures and chemical environment associated with the exhaust gas 216. Some specific examples of materials that can be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel.

The substrate can comprise a non-sulfating $TiO_2$ material, for example. The substrate body can be a PF device, in one or more examples.

The SCR catalyst composition is generally a porous and high surface area material which can operate efficiently to convert $NO_x$ constituents in the exhaust gas 216 in the presence of a reductant 246, such as ammonia. For example, the catalyst composition can contain a zeolite impregnated with one or more base metal components such as iron (Fe), cobalt (Co), copper (Cu), vanadium (V), sodium (Na), barium (Ba), titanium (Ti), tungsten (W), and combinations thereof. In a particular embodiment, the catalyst composition can contain a zeolite impregnated with one or more of copper, iron, or vanadium. In some embodiments the zeolite can be a β-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ. Suitable SCR catalyst compositions can have high thermal structural stability, particularly when used in tandem with particulate filter (PF) devices or when incorporated into SCRF devices, which are regenerated via high temperature exhaust soot burning techniques.

The SCR catalyst composition can optionally further comprise one or more base metal oxides as promoters to further decrease the $SO_3$ formation and to extend catalyst life. The one or more base metal oxides can include $WO_3$, $Al_2O_3$, and $MoO_3$, in some embodiments. In one embodiment, $WO_3$, $Al_2O_3$, and $MoO_3$ can be used in combination with $V_2O_5$.

The SCR catalyst generally uses the reductant 246 to reduce $NO_x$ species (e.g., NO and $NO_2$) to unregulated components. Unregulated components include one or more of species which are not $NO_x$ species, such as diatomic nitrogen, nitrogen-containing inert species, or species which are considered acceptable emissions, for example. The reductant 246 can be ammonia ($NH_3$), such as anhydrous ammonia or aqueous ammonia, or generated from a nitrogen and hydrogen rich substance such as urea ($CO(NH_2)_2$). Additionally or alternatively, the reductant 246 can be any compound capable of decomposing or reacting in the presence of exhaust gas 216 and/or heat to form ammonia. Equations (1)-(9) provide exemplary chemical reactions for $NO_x$ reduction involving ammonia.

$$4NH_3 + 4NO \rightarrow 4N_2 + 6H_2O \tag{1}$$

$$2NH_3 + NO + NO_2 \rightarrow 2N_2 + 3H_2O \tag{2}$$

$$8NH_3 + 6NO_2 \rightarrow 7N_2 + 12H_2O \tag{3}$$

$$4NH_3 + 3O_2 \rightarrow 2N_2 + 6H_2O \tag{4}$$

$$4NH_3 + 5O_2 \rightarrow 2N_2 + 3H_2O \tag{5}$$

$$4NH_3 + 4NO + 3O_2 \rightarrow 4N_2O + 6H_2O \tag{6}$$

$$2NH_3 + 2NO_2 \rightarrow N_2O + N_2 + 3H_2O \tag{7}$$

$$2NH_3 + 2O_2 \rightarrow N_2O + 3H_2O \tag{8}$$

$$NH_3 + \theta_{free} \rightarrow NH^*_3 \tag{9}$$

It should be appreciated that Equations (1)-(9) are merely illustrative, and are not meant to confine the SCR device 220 to a particular NOx reduction mechanism or mechanisms, nor preclude the operation of other mechanisms. The SCR device 220 can be configured to perform any one of the above NOx reduction reactions, combinations of the above NOx reduction reactions, and other NOx reduction reactions.

The reductant 246 can be diluted with water in various implementations. In implementations where the reductant 246 is diluted with water, heat (e.g., from the exhaust) evaporates the water, and ammonia is supplied to the SCR device 220. Non-ammonia reductants can be used as a full or partial alternative to ammonia as desired. In implementations where the reductant 246 includes urea, the urea reacts with the exhaust to produce ammonia, and ammonia is supplied to the SCR device 220. Reaction (10) below provides an exemplary chemical reaction of ammonia production via urea decomposition.

$$CO(NH_2)_2 + H_2O \rightarrow 2NH_3 + CO_2 \qquad (10)$$

It should be appreciated that Equation (10) is merely illustrative, and is not meant to confine the urea or other reductant 246 decomposition to a particular single mechanism, nor preclude the operation of other mechanisms.

The SCR catalyst can store (i.e., absorb, and/or adsorb) reductant for interaction with exhaust gas 216. For example, the reductant 246 can be stored within the SCR device 220 or catalyst as ammonia. A given SCR device 220 has a reductant storage capacity (θ), or an amount of reductant or reductant derivative it is capable of storing. The amount of reductant stored within an SCR device 220 relative to the SCR catalyst capacity can be referred to as the SCR "reductant loading", and can be indicated as a % loading (e.g., 90% reductant loading) in some instances. During operation of SCR device 220, injected reductant 246 is stored in the SCR catalyst and consumed during reduction reactions with NOx species and must be continually replenished. Determining the precise amount of reductant 246 to inject is critical to maintaining exhaust gas emissions at acceptable levels: insufficient reductant levels within the system 34 (e.g., within SCR device 220) can result in undesirable NOx species emissions ("NOx breakthrough") from the system (e.g., via a vehicle tailpipe), while excessive reductant 246 injection can result in undesirable amounts of reductant 246 passing through the SCR device 220 unreacted or exiting the SCR device 220 as an undesired reaction product ("reductant slip"). Reductant slip and NOx breakthrough can also occur when the SCR catalyst is below a "light-off" temperature, for example if the SCR device 220 is saturated with NH3 (i.e. no more storage sites). SCR dosing logic can be utilized to command reductant 246 dosing, and adaptations thereof, and can be implemented by module 238, for example.

A reductant injection dosing rate (e.g., grams per second) can be determined by a SCR chemical model which predicts the amount of reductant 246 stored in the SCR device 220 based on signals from one or more of reductant 246 injection (e.g., feedback from injector 236) and upstream NOx (e.g., NOx signal from upstream NOx sensor 242). The SCR chemical model further predicts NOx levels of exhaust gas 216 discharged from the SCR device 220. The SCR chemical model can be implemented by control module 238. The SCR chemical model can be updatable by one or more process values over time, for example. A dosing governor (not shown), such as one controlled by module 238, monitors a ratio of NOx downstream of the SCR device 220 (measured by the sensor 243) and a NH3 slip that is determined based on the model (Equations 1-9). Deviations between the predicted ratio and a desired ratio can be continuously monitored and a dosing adaptation can be triggered to increase or decrease reductant dosing in order to eliminate or reduce the deviation. Further, in one or more examples, the reductant dosing rate can be adapted to achieve a desired $NO_x$ concentration or flow rate in exhaust gas 216 downstream of the SCR device 220, or achieve a desired $NO_x$ conversion rate. A desired conversion rate can be determined by many factors, such as the characteristics of SCR catalyst type and/or operating conditions of the system (e.g., ICE 24 operating parameters). The desired ratio is a predetermined calibrateable value that indicates a tradeoff between the NOx downstream and NH3 slip.

Over time, inaccuracies of the SCR chemical model can compound to appreciative errors between modeled SCR reductant storage level and actual storage level. Accordingly, the SCR chemical model can be continuously corrected to minimize or eliminate errors. Further, over time and repeated use, the reductant storage capacity (θ) changes, typically reduces. Hence, modeling the chemical process in the SCR device 220 accurately so as to inject the appropriate amount of reductant 246 is a technical challenge. A change in the reductant storage capacity can cause a SCR fault condition that results in an inappropriate amount of reductant 246 being injected based on a model that is calibrated at the original reductant storage capacity when the SCR device 220 was placed into service.

The technical solutions described herein address such technical challenges and provide robust SCR/SCRF fault detection to ensure that emissions from the exhaust system 26 comply with emission regulation. The technical solutions address such technical challenges by detecting such an SCR/SCRF fault using a model that dynamically estimates the reductant storage capacity, and does not rely on the original calibration value. Further, the technical solutions described herein facilitate computing a diagnostic parameter to increase the diagnostic robustness and the diagnostic frequency response of the SCR device 220. Further yet, the technical solutions described herein facilitate selecting information for the dynamic estimation of the reductant storage capacity using one or more flags related to the external physical conditions and to the confidence of estimation accuracy.

Figure 3:
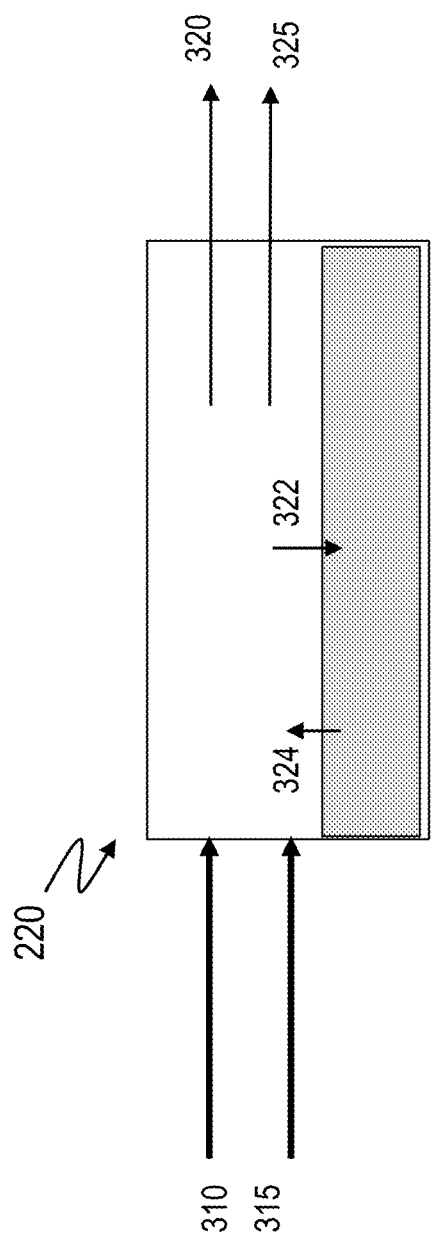
FIG. 3 illustrates an example flow of the gases through an SCR device, according to one or more embodiments.

FIG. 3 illustrates an example flow of the gas exhaust through the SCR device 220, according to one or more embodiments. The control module 238 measures the flow rate (F) of gas volume, and concentration C of the gas. For example, the control module 238 determines an input flowrate of NOx 310 as area of the exhaust pipe*velocity of NOx. Similarly, the input flowrate of $NH_3$ 315 is determined as area of exhaust pipe*velocity of $NH_3$. Further, compensating for the amount of adsorption 322 and amount of desorption 324, and the amounts reacted on the catalyst surface, the control module 238 may determine $C_{NH3}$ as the SCR concentration of $NH_3$, and $C_{NOx}$ as SCR concentration of NOx.

In one or more examples, the control module 238 may determine the mass flow rate 320 of NOx as $W_{NOx}$*flow rate of NOx, where $W_{NOx}$ is the molecular weight of NOx. Similarly, for NH3, the mass flow rate 325 of $NH_3$ is $W_{NH3}$*flowrate of NH3. It should be noted that in other examples, the flowrates and/or the mass flowrates are determined using different techniques than that described herein.

Accordingly, referring back to FIG. 2, the control module 238 controls operation of the injector 236 based on the chemical model and desired NH3 storage set-point to determine an amount of reductant 246 to be injected as described herein. For example, the reducing agent injected into the exhaust gas 216 may form $NH_3$ when injected into the exhaust gas 216. Accordingly, the control module 238 controls an amount of $NH_3$ supplied to the SCR device 220. The SCR catalyst adsorbs (i.e., stores) $NH_3$. The amount of $NH_3$ stored by the SCR device 220 may be referred to hereinafter as an "$NH_3$ storage level", which is typically based on the reductant storage capacity of the SCR catalyst. The control module 238 may control the amount of $NH_3$ supplied to the SCR device 220 to regulate the $NH_3$ storage level.

In one or more examples, the percentage of NOx that is removed from the exhaust gas 216 entering the SCR device 220 may be referred to as a conversion efficiency of the SCR device 220. The control module 238 may determine the conversion efficiency of the SCR device 220 based on $NOx_{in}$ and $NOx_{Out}$ signals generated by the first (upstream) NOx sensor 242 and second (downstream) NOx sensor 243 respectively. For example, the control module 238 may determine the conversion efficiency of the SCR device 220 based on the following equation:

$$SCR_{eff} = (NOx_{in} - NOx_{out})/NOx_{in} \qquad (11)$$

$NH_3$ slip can also be caused because of an increase in the temperature of the SCR catalyst. For example, $NH_3$ may desorb from the SCR catalyst when the temperature increases at times when the $NH_3$ storage level is near to the maximum $NH_3$ storage level. $NH_3$ slip may also occur due to an error (e.g., storage level estimation error) or faulty component (e.g., faulty injector) in the emissions control system 34.

Typically, the control module 238 estimates an $NH_3$ storage level of the SCR device 220 based on the chemical model. In one or more examples, the $NH_3$ storage set-point ("set-point") is calibrateable. The control module 238 uses the chemical model to estimate the current storage level of $NH_3$ in the SCR device 220, and the storage level governor provides feedback to the injection controls to determine the injection rate at which to provide $NH_3$ for reactions according to the chemical model and to maintain the desired tradeoff between the downstream NOx and $NH_3$ slip. A calibrateable set-point may indicate a tradeoff for given operating conditions (e.g., a temperature of the SCR catalyst, storage capacity of the SCR catalyst). The control module 238 controls the reductant injector 236 to manage the amount of reductant injected into the exhaust gas 216 to adjust the ratio of downstream NOx and $NH_3$ slip to the set-point. For example, the control module 238 commands the injector 236 to increase or decrease the amount of reductant being injected into the exhaust gas 216. Additionally, the control module 238 commands the reductant injector 236 to increase or decrease the storage level to maintain the set-point when the set-point has been reached. Accordingly, an accurate chemical model facilitates accurate reductant injection to detect and/or prevent faults such as $NH_3$ slip, NOx breakthrough, and the like.

Figure 4:
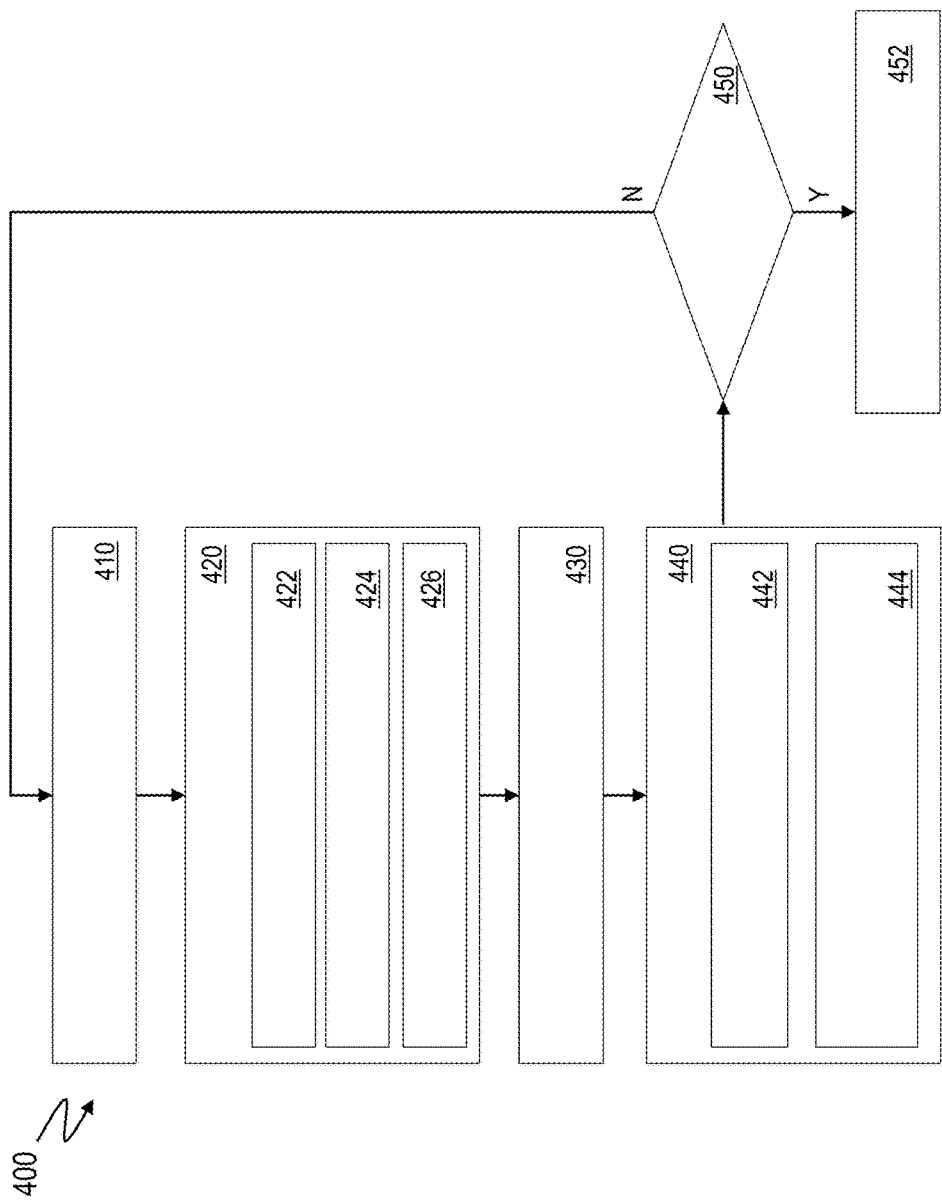
FIG. 4 depicts a flowchart for an example method for estimating the NH3 storage capacity and further computing a diagnostic parameter for the SCR device according to one or more embodiments.

FIG. 4 depicts a flowchart of an example method for estimating the NH3 storage capacity and further computing a diagnostic parameter for the SCR device according to one or more embodiments. The method 400 is implemented by the controller 238, in one or more examples. Alternatively, the method 400 is implemented by one or more electric circuits. In one or more examples, the method 400 is implemented by execution of logic that may be provided or stored in the form of computer readable and/or executable instructions.

The method 400 includes receiving a measurement of NOx from the upstream sensors 242 and the downstream sensor 243, at 410. The method further includes computing an estimated $NH_3$ storage level in the SCR catalyst, at 420.

In one or more examples, the estimation is performed only if an enabling condition, which is determined using a temperature value of the SCR device 220, is satisfied at the time of the estimation. For example, an estimation is performed if the SCR device temperature (T) is within a predetermined range when the estimation of the storage capacity is being performed, and the estimation is not performed if the temperature is outside the predetermined range. If the estimation is not performed, the present iteration of the method 400 is aborted (not shown), and the method continues to operate in a loop. The enabling condition may use factors other than the SCR device temperature in other embodiments.

The estimation computation is performed using the following equation:

$$x(k+1) = x(k) + \qquad (12)$$
$$T_s\left(\frac{1}{M_{NH3}}(u(k) - y_2(k)) - \frac{1}{M_{NOx}}(C_{NOx,in}(k) - y_1(k)) - a_1(k)x(k)\right)$$

In the above equation (12), x(k) represents the $NH_3$ storage level at a discrete time interval k. Ts denotes a sampling time. $M_{NH3}$ denotes molar weight of $NH_3$ (17.031 g/mol). Computing the NH3 storage level includes computing an outlet concentration of $NH_3$ ($y_2$), at 422. In one or more examples, $y_2$ is computed as follows:

$$y_2(k) = C_{NH3,out}(k) = \frac{\tilde{F}(k)(u(k) + a_4(k)x(k))}{\tilde{F}(k) + \theta(k) - x(k)} \qquad (13)$$

Here, u(k) is the amount of reductant 246 injected at interval k, θ is the catalyst $NH_3$ storage capacity, and $a_4$ is a model parameter that changes over time based on calibration parameters, and $\tilde{F}$ is a flowrate parameter computed based on the total flowrate of the exhaust gas 216 using a model parameter $a_3$ that may change over time based on calibration parameters. For example, the model parameter $a_4$ is computed using the temperature T(k), and calibration parameters $K_4$ and $K_8$, both being calibrateable parameters related to the exponential factor of the chemical reaction rates as:

$$a_4 = e^{\left(K_4 - \frac{K_8}{T(k)}\right)} \qquad (14)$$

Further, referring back to equation (2), the flowrate parameter is computed based on the flowrate F of the exhaust gas 216 at the SCR inlet as:

$$\tilde{F}(k) = \frac{F(k)}{a_3} \qquad (15)$$

Here, $a_3$ is a model parameter based on a calibration parameter $K_3$. In one or more examples, $a_3 = K_3$.

Further, in equation (13), the outlet concentration of NH3 is computed based on the storage capacity (θ(k)) of the SCR catalyst at the interval k. The $NH_3$ storage capacity is computed, at 424. The storage capacity is estimated based on a time varying model parameter as $a_5$ follows:

$$\theta(k) = \frac{a_5(k)}{a_3} \quad (16)$$

Here, $a_5$ is computed based on a calibration parameter $K_5$, and in one or more examples, $a_5 = K_5$.

Referring back to the equation (12), $M_{NOx}$ denotes molecular weight of NOx (approximately 30 g/mol). Further, computing the estimated NH3 storage level further includes computing an outlet concentration of NOx ($y_1$), at 426. In one or more examples, $y_1$ is computed as follows:

$$y_1(k) = C_{NOx,out}(k) = \frac{F(k)C_{NOx,in}(k)}{F(k) + a_2(k)x(k)} \quad (17)$$

Here, $F(k)$ is the exhaust flowrate, $C_{NOx,in}$ denotes the concentration of NOx at the inlet of the SCR device 220, and $a_2$ is a model parameter that changes over time based on calibration parameters. In one or more examples, $a_2$ is computed using the temperature $T(k)$, and calibration parameters $K_2$ and $K_7$, that are related to the exponential factor of chemical reaction rates as:

$$a_2 = e^{\left(K_2 - \frac{K_7}{T(k)}\right)} \quad (18)$$

Further yet, the model parameter $a_1$ from the equation (12) is computed using the temperature $T(k)$, and calibration parameters $K_1$ and $K_6$ that are related to the exponential factor of chemical reaction rates as:

$$a_1 = e^{\left(K_1 - \frac{K_6}{T(k)}\right)} \quad (19)$$

The above model provides an estimate of the $NH_3$ storage level in the SCR catalyst at an interval based on an estimate of the $NH_3$ storage capacity of the SCR catalyst computed at that interval. The controller module 238 determines an amount of reductant 246 to inject based on the tradeoff between NOx and $NH_3$ downstream of the SCR device 220. Over time and use of the SCR device 220, the $NH_3$ storage capacity of the SCR catalyst changes and the above described model accounts for such a change, thus providing an improved and more accurate estimate of the $NH_3$ storage level.

Referring to the flowchart of FIG. 4, the method 400 further includes determining an observer convergence of the estimated NH3 storage level value, at 430. The observer convergence result may be a binary value, indicating whether the estimated value is valid (convergent) or invalid (not convergent). The observer convergence is implemented using one or more known techniques, such as to perform computations that ensure that sufficient conditions of local asymptotic convergence are established.

The method 400 further includes computing a diagnostic parameter for determining if the SCR device 220, at 440. The diagnostic parameter determines if the SCR device 220 is experiencing a fault and needs adjustment to correct a condition such as $NH_3$ slip, NOx breakthrough etc. The diagnostic parameter is computed based on a set of previously computed $NH_3$ storage capacity estimates and the corresponding convergence results. The set includes a predetermined number of P computations, such as 50, 100, or any other integer. In one or more examples, the set includes a number of computations over a predetermined window (duration) of time ($T_{window}$), for example, last 10 minutes, last 15 minutes etc. Alternatively, or in addition, the set includes a number of computations since the vehicle 10 was started. Alternatively, or in addition, the set includes all the computations since the SCR device 220 has been commissioned and being used. Computing the diagnostic parameter includes collecting the set of P computations including P estimates of $NH_3$ storage capacity and corresponding P observer convergence values.

Computing the diagnostic parameter further includes selecting a subset of N storage capacity estimates and corresponding convergence values from the set of P computations, the subset including valid computations, at 442. The validity of the computations is determined using the convergence values. If the convergence value indicates that the data is invalid, the corresponding storage capacity estimate is not used in the further computations, otherwise, if the convergence value indicates valid, the estimate is used for computing the diagnostic parameter. Computing the diagnostic parameter further includes using a quadratic function on the selected storage capacity estimate values, at 444.

The diagnostic parameter is compared with a predetermined threshold value, at 450. If the diagnostic parameter exceeds the predetermined threshold, which may be calibrate-able, the SCR device 220 is considered to be experiencing a fault, for example a replacement SCRF or some other correction, at 452. In one or more examples, in case a fault is detected, the control module 238 sends a control signal to an ECU of the vehicle 10 for generating a corresponding notification to the operator. In one or more examples, the notification may include an indication that the exhaust system 26, and particularly the SCR device 220 is to be further diagnosed. The notification may further include a predetermined error code. In case of an automated vehicle, the notification may include a command to navigate the vehicle 10 to a service station for the exhaust system 26. If the diagnostic parameter does not exceed the threshold, and is in a predetermined operative range, that is calibrate-able, no further action is taken. Alternatively, or in addition, in one or more examples, a notification is provided that indicates that the exhaust system 26 and/or the SCR device 220 is operating without a fault.

The method 400, in one or more examples, operates in a loop and may be executed by the control module 238 repeatedly according to a predetermined periodic interval.

Figure 5:
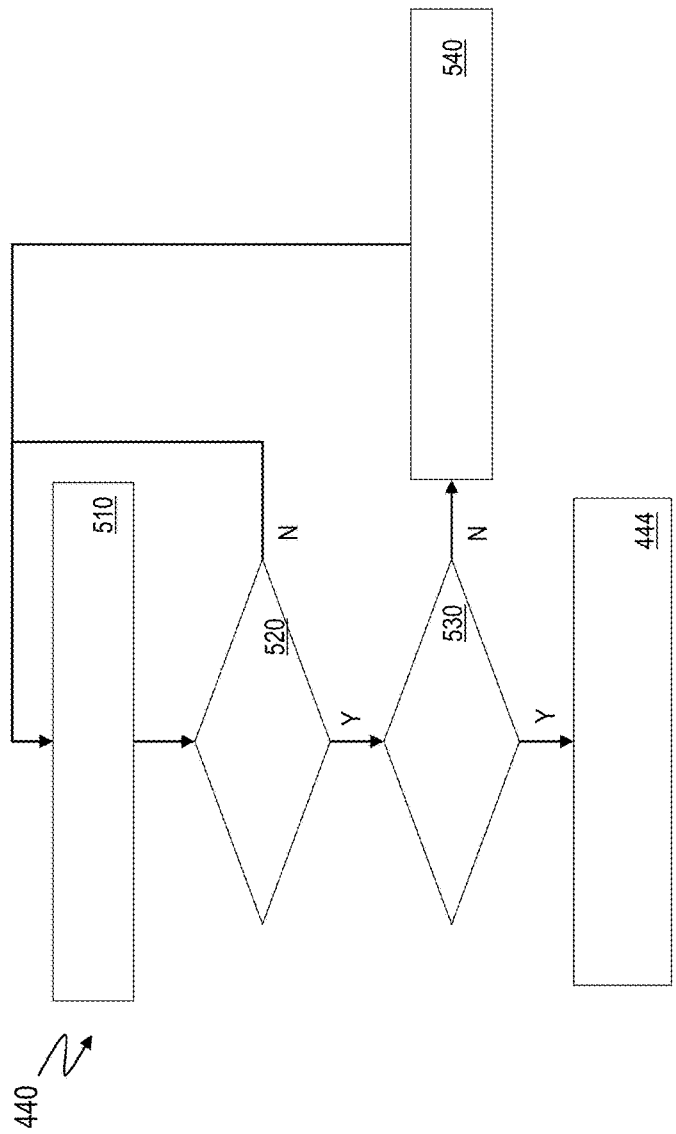
FIG. 5 depicts a flowchart for an example method for computing a diagnostic parameter according to one or more embodiments.

FIG. 5 depicts a flowchart of an example method 440 for computing the diagnostic parameter according to one or more embodiments. The method 440 is a part of the flowchart in FIG. 4, and as described before includes a data selection and diagnostic parameter computation using the selected data. The method 440 includes receiving the computed NH3 storage capacity estimates and corresponding convergence values, at 510. The method 440 further includes checking if the predetermined number of samples of the computations have been collected, at 520. As described earlier, this may be determined based on a number of computations or a time window or both. The method 440 loops over until the predetermined set of computations is collected.

Once the samples (estimates and convergence) are collected, the method 440 includes checking if at least a predetermined proportion of the collected samples are valid, at 530. The validity is checked based on the convergence values in each sample. Accordingly, the method 440 includes checking one or more condition-flags related to the confidence of estimation accuracy to determine the validity of the data samples.

The predetermined proportion may be a percentage, such as at least V % of the collected samples, for example, 60%, 80%, and the like. If at least V % of the collected N samples are not valid, the method 440 includes restarting the collection of the samples. The restart includes removing predetermined samples from those collected, at 540. For example, a predetermined proportion (such as 10%, 25%, or the like) of oldest collected samples are removed and the collection of the samples is resumed with the remaining collected samples still being considered for the next iteration.

If the collected samples include at least V % valid data, the method 440 proceeds to computing the diagnostic parameter, at 444. In one or more examples, the diagnostic parameter is computed using a non-linear function in order to increase the diagnostic robustness and the diagnostic frequency response. The computation may be performed in one or more examples, using the N estimations of the NH3 storage capacity ($\theta_i$ (k)) of the SCR catalyst that satisfy the enabling conditions and for which estimation algorithm convergence are available in the considered time window. The computation uses a nominal value $\theta_{nom}$, which is a predetermined calibrateable value indicative of an average component.

In one or more examples, the method includes applying a quadratic function to the estimates $\theta_i$ (k) in the form:

$$f_i = \begin{cases} (\Theta_i(k)/\Theta_{nom} - 1)^2 & \text{if } \Theta_i(k) < \Theta_{nom} \\ -(\Theta_i(k)/\Theta_{nom} - 1)^2 & \text{otherwise} \end{cases} \quad (20)$$

The above exampled ensures that the $\theta_i$ (k) estimates far from the $\theta_{nom}$ are mapped in bigger values compared to those closed to $\theta_{nom}$. It should be noted that the above is one example of the function used to determine the diagnostic parameter, and that in other embodiments a different example may be used, such as scaling the above function, or any other modification.

Further, the diagnostic parameter is computed as:

$$f_{avg} = \frac{1}{N} \sum_{i=1}^{N} f_i \quad (21)$$

In the above, N is the number of samples collected, with at least V % being valid.

The technical solutions described herein facilitate improvements to emissions control systems used in combustion engines, such as those used in vehicles. For example, the technical solutions provide a model for NH3 storage capacity estimation being performed dynamically. The model can be further used for diagnostic purposes to determine if an SCR device is experiencing a fault condition. The model facilitates the fault detection using a parameter related to the NH3 storage capability. The technical solutions described herein facilitate the model to account for the time variation of the NH3 storage capacity during the component life of the SCR device.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. An emissions control system for treating exhaust gas in a motor vehicle including an internal combustion engine, the emissions control system comprising:
   a selective catalytic reduction (SCR) device; and
   a controller that is configured to perform SCR fault diagnosis, the SCR fault diagnosis comprising:
   computing a plurality of estimated NH3 storage capacity values ($\Theta$) of an SCR catalyst of the SCR device; and
   determining a diagnostic parameter of the SCR device using the plurality of estimated NH3 storage capacity values, the determining comprising:

$$\text{computing } f_i = \begin{cases} (\Theta_i/\Theta_{nom} - 1)^2 & \text{if } \Theta_i < \Theta_{nom} \\ -(\Theta_i/\Theta_{nom} - 1)^2 & \text{otherwise} \end{cases} \text{; and}$$

computing $$f_{avg} = \frac{1}{N} \sum_{i=1}^{N} f_i,$$

where $\Theta_{nom}$ is a predetermined calibration value, $f_{avg}$ is the diagnostic parameter, and N is a number of values in the plurality of estimated NH3 storage capacity values.

2. The emissions control system of claim 1, wherein the controller is further configured to determine an SCR fault in response to the diagnostic parameter exceeding a predetermined threshold.

3. The emissions control system of claim 1, wherein determining the diagnostic parameter further comprises:
   checking that at least a predetermined percentage (V) of the plurality of estimated NH3 storage capacity values ($\Theta$) is valid; and
   computing the diagnostic parameter in response to at least the predetermined percentage (V) of the plurality of estimated NH3 storage capacity values ($\Theta$) being valid.

4. The emissions control system of claim 3, wherein in response to at least the predetermined percentage (V) of the plurality of estimated NH3 storage capacity values ($\Theta$) not being valid:
   removing an oldest set of predetermined number of estimated NH3 storage capacity values from the plurality of estimated NH3 storage capacity values; and
   repeating the SCR fault diagnosis using additional estimated NH3 storage capacity values to the plurality of estimated NH3 storage capacity values.

5. The emissions control system of claim 3, wherein validity of an estimated NH3 storage capacity value is determined based on a condition-flag.

6. The emissions control system of claim 5, wherein the condition-flag is indicative of a confidence of estimation accuracy of the estimated NH3 storage capacity value.

7. The emissions control system of claim 1, wherein the SCR fault diagnosis is performed in response to a SCR catalyst temperature being within a predetermined range at a time the estimated NH3 storage capacity value is computed.

8. An exhaust system for treating exhaust gas emitted by an internal combustion engine by performing a selective catalytic reduction (SCR) of exhaust gas, the exhaust system comprising:
a controller configured to perform SCR diagnosis which comprises:
computing a plurality of estimated NH3 storage capacity values (Θ) of an SCR catalyst of the exhaust system; and
determining a diagnostic parameter using the plurality of estimated NH3 storage capacity values, the determining comprising:

$$\text{computing } f_i = \begin{cases} (\Theta_i/\Theta_{nom} - 1)^2 & \text{if } \Theta_i < \Theta_{nom} \\ -(\Theta_i/\Theta_{nom} - 1)^2 & \text{otherwise} \end{cases}; \text{ and}$$

computing $$f_{avg} = \frac{1}{N}\sum_{i=1}^{N} f_i,$$

where $\Theta_{nom}$ is a predetermined calibration value, $f_{avg}$ is the diagnostic parameter, and N is a number of values in the plurality of estimated NH3 storage capacity values.

9. The exhaust system of claim 8, wherein the controller is further configured to determine an SCR fault in response to the diagnostic parameter exceeding a predetermined threshold.

10. The exhaust system of claim 8, wherein determining the diagnostic parameter further comprises:
checking that at least a predetermined percentage (V) of the plurality of estimated NH3 storage capacity values (Θ) is valid; and
computing the diagnostic parameter in response to at least the predetermined percentage (V) of the plurality of estimated NH3 storage capacity values (Θ) being valid.

11. The exhaust system of claim 10, wherein in response to at least the predetermined percentage (V) of the plurality of estimated NH3 storage capacity values (Θ) not being valid:
removing an oldest set of predetermined number of estimated NH3 storage capacity values from the plurality of estimated NH3 storage capacity values; and
repeating the SCR diagnosis using additional estimated NH3 storage capacity values to the plurality of estimated NH3 storage capacity values.

12. The exhaust system of claim 10, wherein the validity of an estimated NH3 storage capacity value is determined based on a condition-flag.

13. The exhaust system of claim 12, wherein the condition-flag is indicative of a confidence of estimation accuracy of the estimated NH3 storage capacity value.

14. The exhaust system of claim 8, wherein the SCR fault diagnosis is performed in response to a SCR catalyst temperature being within a predetermined range at a time the estimated NH3 storage capacity value is computed.

15. A computer-implemented method for diagnosing a selective catalytic reduction (SCR) device of an exhaust system of an internal combustion engine, the method comprising:
computing a plurality of estimated NH3 storage capacity values (Θ) of an SCR catalyst of the SCR device; and
determining a diagnostic parameter of the SCR device using the plurality of estimated NH3 storage capacity values, the determining comprising:

$$\text{computing } f_i = \begin{cases} (\Theta_i/\Theta_{nom} - 1)^2 & \text{if } \Theta_i < \Theta_{nom} \\ -(\Theta_i/\Theta_{nom} - 1)^2 & \text{otherwise} \end{cases}; \text{ and}$$

computing $$f_{avg} = \frac{1}{N}\sum_{i=1}^{N} f_i,$$

where $\Theta_{nom}$ is a predetermined calibration value, $f_{avg}$ is the diagnostic parameter, and N is a number of values in the plurality of estimated NH3 storage capacity values.

16. The method of claim 15, further comprising, determining an SCR fault in response to the diagnostic parameter exceeding a predetermined threshold.

17. The method of claim 15, wherein determining the diagnostic parameter further comprises:
checking that at least a predetermined percentage (V) of the plurality of estimated NH3 storage capacity values (Θ) is valid; and
computing the diagnostic parameter in response to at least the predetermined percentage (V) of the plurality of estimated NH3 storage capacity values (Θ) being valid.

18. The method of claim 17, wherein in response to at least the predetermined percentage (V) of the plurality of estimated NH3 storage capacity values (Θ) not being valid:
removing an oldest set of predetermined number of estimated NH3 storage capacity values from the plurality of estimated NH3 storage capacity values; and
repeating the diagnosing using additional estimated NH3 storage capacity values to the plurality of estimated NH3 storage capacity values.

19. The method of claim 17, validity of an estimated NH3 storage capacity value is determined based on a confidence of estimation accuracy of the estimated NH3 storage capacity value.

20. The method of claim 15, wherein the diagnostic parameter is computed in response to a SCR catalyst temperature being within a predetermined range at a time the estimated NH3 storage capacity value is computed.

* * * * *